United States Patent [19]

Merkle

[11] Patent Number: 4,881,264
[45] Date of Patent: Nov. 14, 1989

[54] DIGITAL SIGNATURE SYSTEM AND METHOD BASED ON A CONVENTIONAL ENCRYPTION FUNCTION

[76] Inventor: Ralph C. Merkle, 1134 Pimento Ave., Sunnyvale, Calif. 94087

[21] Appl. No.: 79,675

[22] Filed: Jul. 30, 1987

[51] Int. Cl.$^4$ .............................................. H04K 1/00
[52] U.S. Cl. ........................................ 380/25; 380/28; 380/50
[58] Field of Search .................................... 380/23–25, 380/28, 49, 50, 59

[56] References Cited

U.S. PATENT DOCUMENTS

| | | | |
|---|---|---|---|
| 4,200,770 | 4/1980 | Hellman et al. | 380/49 X |
| 4,218,582 | 8/1980 | Hellman et al. | 380/49 X |
| 4,309,569 | 1/1982 | Merkle | 380/23 |
| 4,649,233 | 3/1987 | Bass et al. | 380/25 X |
| 4,661,658 | 4/1987 | Matyas | 380/23 |
| 4,748,668 | 5/1988 | Shamir et al. | 380/28 X |
| 4,771,459 | 9/1988 | Jansen | 380/25 X |
| 4,771,461 | 9/1988 | Matyas | 380/24 |

OTHER PUBLICATIONS

Merkle, *Secrecy, Authentication, and Public Key Systems;* UMI Research Press, Ann Arbor, Chaps. 5–6 (1979).
Diffie et al., "New Directions in Cryptography", "IEEE Trans. on Info. Theory", vol. IT-22, No. 6, pp. 644–654 (Nov. 1976).

*Primary Examiner*—Stephen C. Buczinski
*Assistant Examiner*—Bernarr E. Gregory
*Attorney, Agent, or Firm*—Flehr, Hohbach, Test, Albritton & Herbert

[57] ABSTRACT

A method of generating digital signatures for signing an infinitely expandable series of messages $M_i$. An infinitely expandable tree of signature nodes is used, where each node can be used to sign a message. Each node is also used to sign up to k subnodes, where k is an integer greater than one. Each signature used, both for signing messages and for signing subnodes, is a one time signature, which in the preferred embodiment is based on a one-way function F. The function F is made public. To sign a message $M_i$ the signer selects a previously unused node (i.e., node i) from the signature tree. The message signing key at this node is then used to sign this message. The sequence of nodes from the root of the tree (i.e. node l) to node i is then used to verify that the message signature is correct and has not been tampered with. Furthermore, this process proves that the message has not been tampered with. Advantages of the invention include the infinite expandability of the signature tree, dependable verification of messages based on the use of secure one time signatures (e.g., which may be based on one way functions), the small amount of computation required to set up a signature tree, the small amount of storage required to maintain a tree, and the ability to implement the invention using high speed conventional encryption equipment and methods.

9 Claims, 5 Drawing Sheets

DIGITAL SIGNATURE SYSTEM AND METHOD BASED ON A CONVENTIONAL ENCRYPTION FUNCTION

The present invention relates generally to encryption systems and methods, and particularly to digital signature encryption systems and methods.

BACKGROUND OF THE INVENTION

A digital signature is an encrypted message which can be used to prove that person A sent a message M (e.g., a contract) to person B. The digital signature is used both to prove that A sent the message, and also to prove that message M is in fact the message that A sent with the digital signature.

Digital signatures were invented to solve a major difficulty which has limited the application of conventional cryptography, i.e., its inability to deal with the problem of dispute. Conventional authentication systems can prevent third party forgeries, but cannot settle disputes between the sender and receiver as to what message, if any, was sent.

In current commercial practice, the validity of contracts and agreements is guaranteed by handwritten signatures. A signed contract serves as proof of an agreement which the holder can present in court if necessary, but the use of signatures requires the transmission and storage of written documents. This presents a major barrier to more widespread use of electronic communications in business.

The essence of a signature is that although only one person can produce it, anybody can recognize it. If there is to be a purely digital replacement for this paper instrument, each user must be able to produce messages whose authenticity can be checked by anyone, but which could not have been produced by anyone else, especially the intended recipient. In a conventional system the receiver authenticates any message he receives from the sender by deciphering it in a key which the two hold in common. Because this key is held in common, however, the receiver has the ability to produce any cryptogram that could have been produced by the sender and so cannot prove that the sender actually sent a disputed message.

Public key cryptosystems can provide a direct solution to the signature problem. However it is possible to generate digital signatures without using public key cryptosystems, and the present invention is such a system.

It should be noted that one of the primary purposes of public key systems is to securely convey secret information, whereas the purpose of digital signature systems is only to authenticate messages (which may or may not be secret).

In general, a person A who digitally signs a message has secret information that only he knows which allows him to do this. Thus, A knows a secret signing key herein called $SIGN_A$. This secret signing key is not known to anyone else, nor would it ever be revealed — even to a judge in the event of a dispute.

If person B receives a digitally signed message from A that has been signed with $SIGN_A$, and yet B does not know what $SIGN_A$ is, then B must have some other information that allows verification of the signature. This information we call a verifying key $VERIFY_A$. $VERIFY_A$ must be known to B and in general we assume that $VERIFY_A$ is public knowledge.

Using the present invention, A can easily generate a unique digital signature for any message M, but no one else can generate this digital signature. An important aspect of the present invention, and any useful digital signature system, is that anyone who knows $VERIFY_A$ can verify that a digitally signed message M was signed by A, and has not been altered.

In a system in which many users wish to sign and verify messages, it is necessary to generate many pairs of keys. That is, if users A, B, C, D and E all wish to sign and verify messages then the key pairs

| | |
|---|---|
| $SIGN_A$ | $VERIFY_A$ |
| $SIGN_B$ | $VERIFY_B$ |
| $SIGN_C$ | $VERIFY_C$ |
| $SIGN_D$ | $VERIFY_D$ |
| $SIGN_E$ | $VERIFY_E$ | must exist.

Each user must know his own signing key, and must not know any other user's signing key. All users must know all the verification keys.

While other digital signature systems have been proposed that rely only on conventional encryption functions, or on one way functions, none has quite succeeded in providing the convenience of systems based on more complex mathematical problem. such as factoring. Note that the RSA public key cryptosystem is based on factoring.

U.S. Pat. No. 4,309,569 describes a digital signature for authenticating messages. This digital signature utilizes an authentication tree function of a one way function. Furthermore, it is pre-certified to the extent that the underlying encryption function has been certified. The method described in U.S. Pat. No. 4,309,569 is an improvement over the prior methods in that it eliminates the large storage requirement of the prior methods. This method was therein coined "tree authentication" because it uses a binary (or K-ary) tree of recursive calls to a one way function to authenticate a digital signature.

A full explanation of the digital signature method disclosed in U.S. Pat. No. 4,309,569, can be found in chapter 5 of Secrecy, Authentication and Public Key Systems, by Dr. Ralph Merkle, UMI Research Press (1982).

A significant limitation of the digital signature method disclosed in U.S. Pat. No. 4,309,569 is that each tree function is useful for signing only a limited, preselected number of messages. In particular, when a tree is defined it has a fixed number of leaf nodes, and each leaf node can only be used once. When all the leaf nodes of the tree have been used, a new tree must be set up. Another problem, is that a large precomputation is required to set up a new tree. This makes it inconvenient to set up large trees which will be useable for signing thousands or millions of messages.

The present invention provides an infinite tree of one time signatures. As will be explained below, the present invention provides a relatively convenient method of generating digital signatures for an infinite (i.e., indefinite or unlimited) number of messages. It also avoids the need for an expensive precomputation. It should also be noted that even though the present invention uses a "tree", both the method of the present invention, and the "tree" used by this method are quite different than the "tree" used in U.S. Pat. No. 4,309,569. In fact, a wide variety of tree data structures are used in computer science for a very wide variety of functions, and, as will be evident to those who consider the matter, the tree used in the present invention has a different data structure and is used in a different manner than the tree in U.S. Pat. No. 4,309,569.

As will described in more detail below, advantages and features of the present invention include the infinitely expandability of the signature tree, dependable verification of messages based on the use of secure one time signatures (e.g., which may be based one way functions), the small amount of computation required to set up a signature tree, the small amount of storage required to maintain a tree, and the ability to implement the invention using high speed conventional encryption equipment and methods.

SUMMARY OF THE INVENTION

In summary, the present invention is a method of generating digital signatures for signing a series of messages $M_i$. An infinitely expandable tree of signature nodes is used, where each node can be used to sign and verify a message. Each node is also used to sign and verify up to k subnodes, where k is an integer greater than one.

Each signature used, both for signing messages and for signing subnodes, is a one time signature, which in the preferred embodiment is based on a one way function F. The function F is made public.

To sign a message $M_i$ the signer selects a previously unused node (i.e., node i) from the infinite tree. The message signing key at this node is then used to sign this message. The sequence of nodes from the root of the tree (i.e., node 1) to node i is then used to verify that the message signature is correct and has not been tampered with. Furthermore, this process proves that the message has not been tampered with.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Before describing the present invention in detail, additional background information is provided for those not familiar with cryptography in the following sections entitled Convention Cryptography, Public Key Systems, Digital Signatures, and One Way Hash Functions.

Conventional Cryptography. The following background information is mostly from Diffie, W., and Hellman, M.E. "New directions in cryptography." IEEE Transactions on Information Theory, IT-22, 6 (Nov. 1976), p.644–654.

Conventional cryptographic systems provide secrecy and authentication for information which may be overheard or modified by unauthorized third parties. This is done by encrypting the plaintext P with a key K to produce ciphertext $C=S_K(P)$, where $S_K$ denotes the enciphering function under key K. Only authorized users know K, and so only they can decipher C by computing $P=S_K^{-1}(C)$. Although unauthorized users know C and the set of functions $\{S_K\}$, this does not allow them either to determine P or to modify C to produce C' which deciphers to a meaningful message.

Figure 1:
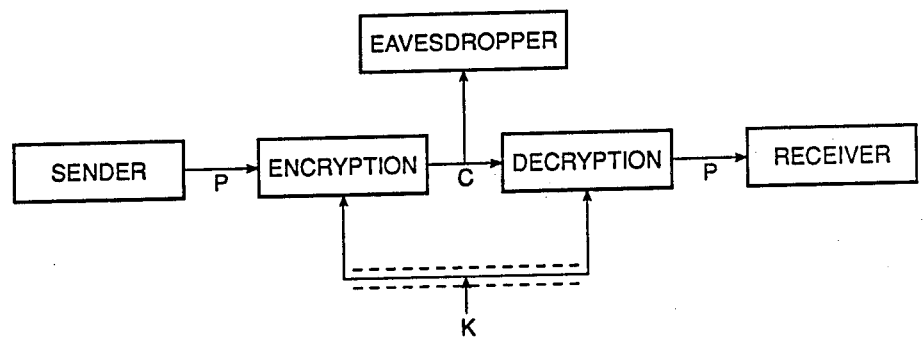
FIG. 1 is a flow chart of the flow of information in a cryptographic privacy system.

The security of such systems resides entirely in the key K. All other components of the systems are assumed to be public knowledge. To maintain security, the legitimate users of the system must learn key K while preventing others from learning it. To date, this has been done by sending key K to the legitimate users of the system over special physically secure communication channels, e.g., registered mail or couriers. The flow of information in a conventional cryptographic system is shown in FIG. 1.

Public Key Systems. The difficulty of distributing keys has been one of the major limitations on the use of conventional cryptographic technology. In order for the sender and receiver to make use of a physically secure channel such as registered mail for key distribution, they must be prepared to wait while the keys are sent, or have made prior preparation for cyptographic communication.

In the military, the chain of command helps to limit the number of user-pair connections, but even there, the key distribution problem has been a major impediment to the use of cryptography. This problem will be accentuated in large commercial communication networks where the number of possible connections for n users is $(n^2-n)/2$. A system with one million users has almost 500 billion possible connections, and the cost of distributing this many keys is prohibitive.

Figure 2:
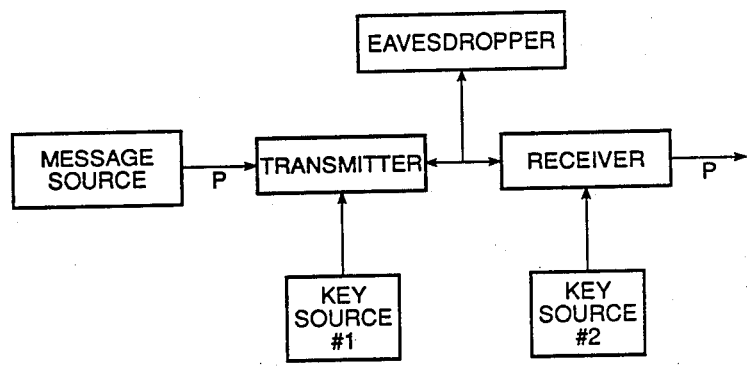
FIG. 2 is a flow chart of the flow of information in a public key system.

At this point we introduce a new kind of cryptographic system which simplifies the problem of key distribution. It is possible to dispense with the secure key distribution channel of FIG. 1, and communicate over an insecure channel without any prearrangement. As indicated in FIG. 2, two-way communication is allowed between the transmitter and receiver, but the eavesdropper is passive and only listens. Systems of this type are called public key systems, in contrast to conventional systems.

The reason that keys must be so carefully protected in conventional cryptographic systems is that the enciphering and deciphering functions are inseparable. Anyone who has access to the key in order to encipher messages can also decipher messages. If the enciphering and deciphering capabilities are separated, privacy can be achieved without keeping the enciphering key secret, because it can no longer be used for deciphering.

Public key systems must be designed so that it is easy to generate a random pair of inverse keys E, for enciphering, and D, for deciphering, and easy to operate with E and D, but computationally infeasible to compute D from E.

A public key cryptosystem is a pair of families, $(E_K)$ and $\{D_K\}$ for K in $\{K\}$, of algorithms representing an invertible transformation and its inverse defined such that:

1. For every K in $\{K\}$, $D_K$ is the inverse of $E_K$. That is, $D_K(E_K(M))=M$, for any K and any M.

2. For every K in {K} and M in {M}, the values $E_K(M)$ and $D_K(M)$ are easy to compute.
3. For nearly all K in {K}, any easily computed algorithm equivalent to $D_K$ is computationally infeasible to derive from $E_K$.
4. For every K in {K}, it is feasible to generate the inverse pair $E_K$ and $D_K$ from K.

The third property allows a user's enciphering key $E_K$ to be made public without compromising the security of his secret deciphering key $D_K$. The cryptographic system is therefore split into two parts, a family of enciphering transformations and a family of deciphering transformations, in such a way that given a member of one family it is infeasible to find the corresponding member of the other.

The fourth property guarantees that there is a feasible way of computing corresponding pairs of inverse transformations when no constraint is placed on what either the enciphering or deciphering transformation is to be. In practice, the crypto-equipment must contain a true random number generator (e.g., a noisy diode) for generating K, together with an algorithm for generating the $E_K-D_K$ pair from K.

A system of this kind greatly simplifies the problem of key distribution. Each user generates a pair of inverse transformations, E and D. He keeps the deciphering transformation D secret and makes the enciphering transformation E public by, for example, placing it in a public directory similar to a phone book. Anyone can now encrypt messages and send them to the user, but no one else can decipher messages intended for him.

It is possible, and often desirable, to encipher with D and decipher with E. For this reason, $E_K$ is sometimes called the public key, and $D_K$ the secret (or signing) key.

Digital Signatures. A second difficulty which has limited the application of conventional cryptography is its inability to deal with the problem of dispute. As mentioned above, conventional authentication systems can prevent third party forgeries, but cannot settle disputes between the sender and receiver as to what message, if any, was sent.

Public key cryptosystems provide a direct solution to the signature problem if they satisfy, in addition to conditions 1 through 4 above, the additional condition
1'. For every K in {K}, $E_K$ is the inverse of $D_K$. That is, for any K and any M, $E_K D_K(M) = M$.

If user A wishes to send a signed message M to user B, he operates on it with his private key $D_A$ to produce the signed message $S = D_A(M)$. $D_A$ was used as A's deciphering key when privacy was desired, but is now used as his "enciphering" or "signing" key. When user B receives S he can recover M by operating on S with A's public key $E_A$.

B saves S as proof that user A sent him the particular message M. If A later disclaims having sent this message, B can take S to a judge who obtains $E_A$ and checks that $E_A(S) = M$ is a meaningful message with A's name at the end, the proper date and time, etc. Only user A could have generated S because only he knows $D_A$, so A will be held responsible for having sent M.

This technique provides unforgeable, message dependent, digital signatures, but allows any eavesdropper to determine M because only the public information $E_A$ is needed to recover M from S. To obtain privacy of communication as well, A can encrypt S with B's public key and send $E_B(S) = E_B D_A(M)$ instead of S. Only B knows $D_B$, so only he can recover S and thence M:

$$S = D_B(\text{encrypted signature} = E_b(S))$$

$$M = E_A(S).$$

B still saves S as proof that user A sent him M.

As noted above, while public key cryptosystems can be used to digitally sign messages, it is possible to digitally sign messages without a public key cryptosystem. The current invention is not a public key cryptosystem. However, the signing key $SIGN_A$ used in the present invention is analogous to the secret key $D_A$; and the verification key $VERIFY_A$ is analogous to the public key $E_A$.

One Way Hash Functions. Arbitrary messages can be arbitrary large. Thus, a contract might be many pages long and be represented in a computer by several thousand or more bytes.

There are many instances in which a large data field (e.g., 10,000 bits) needs to be authenticated, but only a small data field (e.g., 100 bits) can be stored or authenticated. It is often required that it be infeasible to compute other large data fields with the same image under the hash function, giving rise to the need for a "one way hash function".

Most digital signature systems describe only how to sign short, fixed length messages. For signing purposes it is common practice to "hash down" the message with a cryptographically secure hash function—often called a "one-way hash function"—to produce a short fixed length message that is equivalent to the original message for authentication purposes.

Intuitively, a one way hash function F is one which is easy to compute but difficult to invert and can map arbitrarily large data fields onto much smaller ones. If $y = F(x)$, then given x and F, it is easy to compute y; but given y and F it is effectively impossible to compute x. More precisely:
1. The one way hash function F can be applied to any argument of any size. When F is applied to more than one argument (e.g., $F(x_1, x_2)$), F is applied to the concatenation of the arguments, i.e., $F(<x_1, x_2>)$.
2. F always produces a fixed size output, e.g., 100 bits.
3. Given F and x it is easy to compute $F(x)$.
4. Given F and $F(x)$, it is computationally infeasible to determine x.
5. Given F and x, it is computationally infeasible to find an $x' \neq x$ such that $F(x) = F(x')$.

The major use of one way functions is for authentication. If a value y can be authenticated, we can authenticate x by computing $y = F(x)$ and authenticating y.

It is extremely important that no other input $x'$ can be found (although they probably exist) which will generate y, and that a relatively small y can authenticate an arbitrarily large x. These properties are crucial for the convenient authentication of large amounts of information. Although a 100 bit y is plausible, selection of the size in a real system involves trade-offs between the reduced cost and improved efficiency of a smaller size, and the improved security of a larger size.

Because y is used to authenticate the corresponding x, it would be intolerable if someone could compute an $x'$ such that $y = F(x) = F(x')$. The fraudulent $x'$ could be substituted for the legitimate x and would be authenticated by the same information. If y is 100 bits long, an interloper must try about $2^{100}$ different values of $x'$ before getting a value such that $F(x') = y$. In an actual system, F will be applied to many different values of x, producing many different values of y. As a consequence, trying fewer than $2^{100}$ different values of x' will probably yield an x' such that $F(x')=y$ for some already authenticated y. To take a concrete example, assume F has been applied to $2^{40}$ different values of x, and produced $2^{40}$ corresponding values of y, each of which has been authenticated. If the y's are 100 bits, then a random search over $2^{60}$ values of x would probably yield an x' such that $y=F(x)=F(x')$ for some value of y. While this search is still difficult, it is easier than searching over $2^{100}$ different values of x. This demonstrates that y might have to be longer than expected in a heavily used system. Forcing an opponent to search over all $2^{100}$ different values would be more desirable. This can usually be done by using many different functions ($F_1, F_2, ...$). The effect of using many different one way functions is to prevent analysis of F by exhaustive techniques, because each value of x is authenticated with a distinct $F_i$. This will significantly increase security, yet requires only minor changes in implementation.

One Way Hash Functions based upon Conventional Cryptographic Functions

One way functions such as F can be defined in terms of conventional cryptographic functions. For example, if we define a conventional encryption function $S_{key}()$ as:

ciphertext = $S_{key}$(plaintext)

then we can define a one way function $F(x)$ as:

$F(x) = y = S_x(0)$

That is, we encrypt a constant using x as the key. The resulting ciphertext is the output of the one way function F. Deducing x, given that we know ciphertext y, is now equivalent to determining the key given that we know the plaintext is 0 and the ciphertext is y.

For convenience, $S_x(0)$ will sometimes be written as $S(x,0)$

One way hash functions —e.g., a one way function which accepts an arbitrarily large input (say, a few thousand bytes) and produces a small fixed size output (say, 64 bits) —can be based on repeated applications of a conventional encryption function. The following is one example of a one way hash function defined in this manner.

Assume that $S_{key}$(plaintext) is a conventional encryption function which uses a 200 bit key to encrypt 100 bit blocks of plaintext into 100 bit blocks of ciphertext. (Note that the key can be larger than the plaintext blocksize.)

We first define $F_0$, which is simpler than F and which satisfies properties 2, 3, 4 and 5 (listed above), but whose input x is restricted to 200 bits. We define:

$F_0(x) = y = S_x(0)$ $F_0$ accepts a 200 bit input x and produces a 100 bit output y, as desired. Furthermore, given y, the problem of finding an x' such that $F(x')=y$ is equivalent to finding a key x' such that $y=S_{x'}(0)$. If S is a good encryption function, this is computationally infeasible.

If the input x to F is fewer than 200 bits, then we can "pad" x by adding 0's until it is exactly 200 bits, and then define $F=F_0$. If the input x is more than 200 bits, we will break it into 100 bit pieces:

$x = x_1, x_2, ..., x_k$ where each $x_i$ is 100 bits long. Then F is defined in terms of repeated applications of $F_0$. $F_0$ is first applied to $x_1$ and $x_2$ to obtain $y_1 = F_0(x_1, x_2)$.

Then

| |
|---|
| $y_2 = F_0(y_1, x_3)$ |
| $y_3 = F_0(y_2, x_4)$ |
| $y_4 = F_0(y_3, x_5)$ |
| . |
| . |
| . |
| $y_i = F_0(y_{i-1}, x_{i+1})$ |
| . |
| . |
| . |
| $y_{k-1} = F_0(y_{k-2}, x_k)$. |

$F(x)$ is defined to be $y_{k-1}$, the final y in the series. If x is not an exact multiple of 100 bits, then it is padded with zeros, as above.

Using the above procedure, F can accept arbitrarily large values for x. Although complexity theory has not progressed to the point where it is possible to prove that it will be computationally infeasible to find any vector x' not equal to x such that $F(x)=F(x')$, a plausibility argument can be made inductively that this is the case. See chapter 2 of Secrecy, Authentication and Public Key Systems, by Dr. Ralph Merkle, UMI Research Press (1982). The design of one way hash functions should be approached with caution: the most obvious approaches are sometimes vulnerable to "square root" attacks. For example, if we wish to reduce 112 bits to 64 bits using DES (the National Bureau of Standards' Data Encryption Standard), one obvious technique would be to break the 112 bits into two 56-bit blocks and then double encrypt a fixed constant. That is, if the two 56-bit blocks are designated K1 and K2, then compute: $S_{K2}(S_{K1}(0))$. Unfortunately, it is possible to determine a new K1' and K2' in about operations that will produce the same result using a "meet in the middle" or "square root" attack. While avoiding such attacks is not usually difficult, it is important to know that they exist and must be guarded against—several variations on the above theme are immune to square root attacks.

For the purposes of the remainder of this specification, we assume that a secure one way hash function is available, possibly based on some conventional encryption function. We shall denote this function as F.

Signing A One Bit Message

The following is a brief introduction to the uses of one time digital signatures.

Person A can sign a one bit message for person B by using the following protocol: first, A uses F to one way encrypt two values of x: x[1] and x[2] - producing two values of y: y[1] and y[2]. Second, A makes y[1] and y[2] public while keeping x[1] and x[2] secret. Finally, if the one bit message is a "1", A signs it by giving x[1] to B. If the one bit message is a "0", A signs it by giving x[2] to B.

If the one bit message was "1", B can prove that A signed it by presenting x[1] and showing that $F(x[1])=y[1]$. Because F and the y's are public, anyone can verify the results of this computation. Because only A could know x[1] and x[2], B's knowledge of x[1]

implies that A gave x[1] to B —an act which, by prior agreement, means that A signed the message "1".

This system is called a one time signature system because each x-y pair can only be used once. Additional uses would allow interlopers to forge messages, and would allow receivers to replace authentic messages with other messages.

Note that each set of x values form a secret signing key, while the corresponding y values form a public verification key.

Signing A Several-Bit Message

If A generated many x's and many y's, then A could sign a message with many bits in it —by using two x-y pairs for each bit in the message. The receiver cannot authenticate a modified message because, for any bits in the message which are changed, he will not be able to produce the corresponding signature. This is the Lamport-Diffie one time signature. (See "New Directions in Cryptography", IEEE Transactions on Information Theory, IT-22, 6 (Nov. 1976), p.644–654.)

The inventor, Merkle, proposed an improvement to this method which reduces the signature size by almost twofold. In particular, instead of generating two x's and two y's for each bit of the message, A generates only one x and one y for each bit of the message to be signed. When one of the bits in the message to be signed is a "1", A releases the corresponding value of x — but when the bit to be signed is a "0", A releases nothing. In addition, A also signs a count of the "0" bits in the message. Without the signed count field, B could pretend that he did not receive some of the x's, and therefore he could pretend that some of the "1" bits in the signed message were "0". With the signed count field, when B pretends that a "1" bit was actually a "0" bit, B must also increase the value of the count field—which can't be done because B cannot produce the x's corresponding to the increased count field value. Because the count field has only $\log_2 n$ bits in it, the signature size is decreased by almost a factor of two — from $2n$ to $n + \log_2 n$, where $\log_2 n$ is rounded up to the closest integer.

As an example, if we wished to sign the 8-bit message "0100 1110" we would first count the number of "0" bits (4) and then append a 3-bit count field (with the value 4) to the original 8-bit message producing the 11-bit message "0100 1110 100" which we would sign by releasing x[2], x[5], x[6], x[7] and x[9]. B cannot pretend that he did not receive x[2], because the resulting erroneous message — "0000 1110 100" would have 5 0's in it, not 4. Similarly, pretending he did not receive x[9] would produce the erroneous message "0100 1110 000" in which the count field indicates that there should be no 0's at all. There is no combination of x's that B could pretend not to have received that would let b concoct a legitimate message. For a more complete explanation of this reduced signature, see chapter 5 of Secrecy, Authentication and Public Key Systems, by Dr. Ralph Merkle, UMI Research Press (1982).

Robert Winternitz proposed an improvement which reduces the signature size by several fold. Instead of signing a one bit message by computing y[1]=F(x[1]) and y[2]=F(x[2]), A could sign a 2-bit message by computing y[1]=F(F(F(x[1]))) and y[2]=F(F(F(x[2]))). Notationally, we will show repeated applications of the function F with a superscript—$F^3(x)$ is F(F(F(x))), $F^2(x)$ is F(F(x)), $F^1(x)$ is F(x), and $F^0(x)$ is x. If A wishes to sign message m—which must be one of the messages "0", "1", "2", or "3" — then A reveals and $F^m(x[1])$ and $F^{3-m}(x[2])$. B can easily verify the power of F that A used by counting how many more applications of F must be used to reach y. Computing complimentary powers of both x[1] and x[2] is necessary because B might pretend to have received a higher power than A actually sent him. That is, if A sent $F^2(x[1])$ to B, B could compute $F^3(x[1])$ and pretend that A had sent THIS value instead. However, if B does this then B must compute $F^0(x[2])$ as well — which A would have computed and sent to B if A had actually signed the message "3". Because A actually sent $F^1(x[2])$, this means B must compute x[2] given only F(x[2]) — which he can't do. Sending the complimentary powers of x[1] and x[2] in this technique is directly analogous to releasing either x[1] or x[2] in the Lamport-Diffie method.

Though this example shows how to sign one of four messages, the system can be generalized to sign one of n messages by computing $y[1] = F^{n-1}(x[1])$ and $y[2] = F^{n-1}(x[2])$. Then, the signature for message i would be the pair of values $F^{n-1-i}(x[1])$ and $F^i(x[2])$.

The almost twofold improvement proposed by Merkle for the 1-bit one time signature generalizes to the Winternitz one time signature.

Thus, the original one time signature system proposed by Lamport and Diffie, and improved by Winternitz and Merkle, can be used to sign arbitrary messages and has excellent security. The storage and computational requirements for signing a single message are quite reasonable. Unfortunately, signing more messages requires many more x's and y's and therefore a very large entry in the public file (which holds the y's). To allow A to sign 1000 messages might require roughly 10,000 y's — and if there were 1000 different users of the system, each of whom wanted to sign 1000 messages, this would increase the storage requirement for the public file to hundreds of megabytes — which is unwieldy and has effectively prevented use of these systems.

The Present Invention

An Infinite Tree of One Time Signatures

Figure 3:
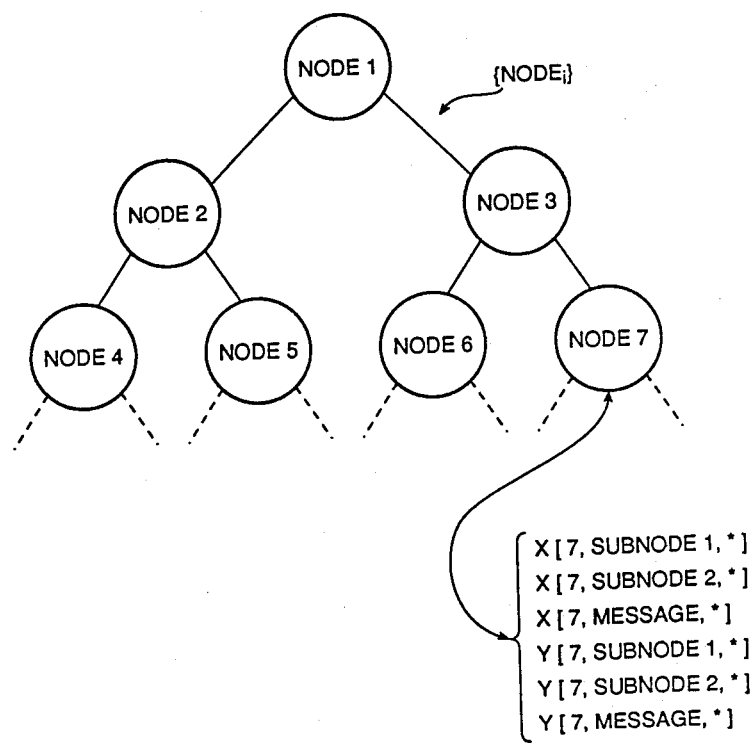
FIG. 3 is a schematic diagram of the infinitely expandable node tree used in the present invention.

Referring to FIG. 3, the general idea in the present invention is to use an infinitely expandable tree 20 of one time signatures. For simplicity, we assume that the tree 20 is binary. The root 22 of the tree 20 is authenticated simply by placing it in the public file 24. Each node 25 of the tree performs three functions: (1) it authenticates the left sub-node 26 (2) it authenticates the right sub-node 28 and (3) it signs a single message 30. Because the number of nodes in the tree 20 is infinitely expandable, an infinite number of messages can be signed. To perform these three functions, each node must have three signatures—a "left" signature, a "right" signature, and a "message" signature. The "left" signature is used to "sign off" on the left sub-node, the "right" signature is used to "sign off" on the right sub-node, while the "message" signature is available to sign a message.

Notationally, it is convenient to number the nodes in the tree in the following fashion (see FIG. 3):

The root node is designated "1".

For and given node, designated as node i:

The left sub-node of node i is designated $2i$.

The right sub-node of node i is designated $2i+1$.

This assignment of numbers has many convenient properties It uniquely numbers every node in the infinite tree; the left and right sub-nodes are easily computed from a parent node; and the parent node can be computed from the sub-node by a simple integer division by 2. Note that if we start from node 1 and follow the left sub-node at each node, the node numbers are: 1, 2, 4, 8, 16, 32, 64, . . . .

We adopt some further notational conventions to distinguish between the x's and y's used to sign different messages at different nodes in the tree — in particular, we shall use a three dimensional array of x's and y's:

array x[<node #>,<l, r, or m>, <index within the one time signature>]

and array y[<node #> <l, r, or m>, <index within the one time signature>]

where "node #" identifies the node being used, "l" refers the left sub-node, "r" refers to the right sub-node, "m" referes to the message to be signed, and "<index . . .>" is the set of components for signing or verifying one message or one sub-node.

If we use the original Lamport-Diffie method (involving 128 x's per signature) then all the x's at node i would be:

x[i, left,1], x[i, left,2]. . . x[i, left,128]
x[i, right,1], x[i, right,2]. . . x[i, right,128]
x[i,message,1], x[i,message,2]. . . x[i,message,128]

We will designate all the x's for the "left" signature at node i by x[i,left,*]. Similarly, we shall designate all the y's associated with the message signature at node i by y[i,message,*]. Furthermore, we designate all the x's at node i (left, right, and message) by x[i,*,*].

As will be explained below, we will need to apply a one way hash function to all the y's for a given signature, so we define the notation F(y[i,right,*]) to mean use of the one way hash function F applied to all the y's for authenticating the right sub-node of node i.

Thus, our fundamental data structures will be two infinitely expandable three dimensional arrays x and y, where each y is computed from the corresponding x by applying F.

We shall also need to compute a "hash total" for all the y's at a given node. We do this by first applying F to each signature individually, and then applying F to the three resultant values. Thus, we define the one way hash total HASH(i) of node i as follows:

HASH(i)=F(F(y[i,left,*]), F(y[i,right,*]), F(y[i,message,*]))

The one way hash total for node i has the important property that if we already know HASH(i) and someone sends us what they claim are the y[i,*,*] values we can confirm that they sent us the correct values (or show that they sent the wrong values) by recomputing the one way hash total function. If the value of HASH(i) computed from the values sent to us matches the value that we already know, then we know we have received the correct y[i,*,*] values.

Prior to the signature protocol, A enters HASH(l) into a public file. This value authenticates the root node of A's authentication tree, and it is assumed that it is publicly known to everyone. That is, HASH(l) is the verification key $VERIFY_A$ for A, as explained in the section on Public Key Systems, above.

We can now describe the algorithm that A uses to sign message M with signature i, and that B uses to check the signature.

Figure 4:
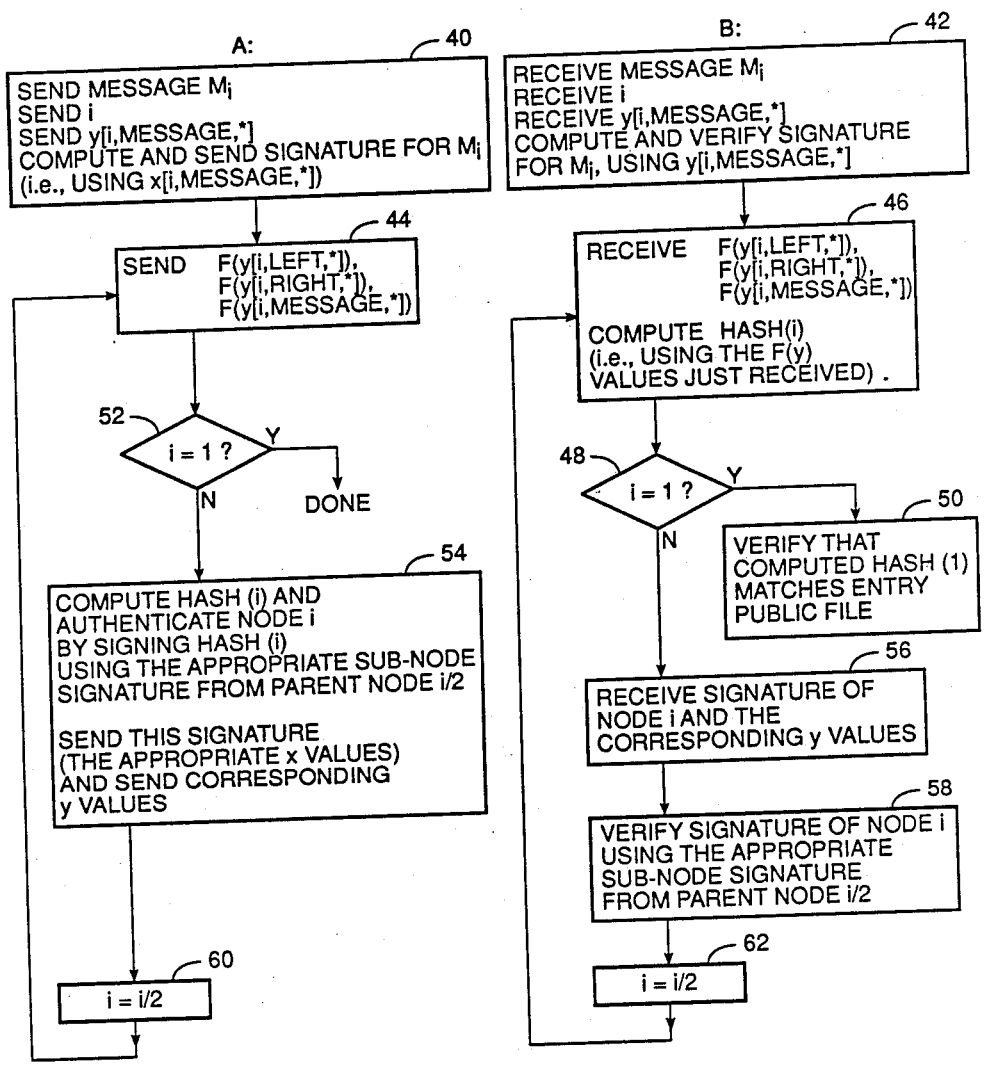
FIGS. 4 and 5 are flow charts of the method of the present invention.

The algorithm is as follows (see also FIG. 4):

Both A and B agree in advance on the message M to be signed. A selects the node i that will be used to sign it.

1. A sends the message M, i, and y[i,message,*] to B (boxes 40 and 42). Note that in some circumstances B may send to A the message (e.g., a contract) that he wants A to sign.

2. A signs message M by sending B the appropriate subset of x's in x[i,message,*]. (box 40) For instance, a short message can be signed using the Lamport-Diffie one time signature described above, or any of the improved one time signatures. For longer messages, the message is hashed down using a one way hash function (as described previously) and then the resulting short, fixed length message is signed.

3. B checks that the released subset of the x[i,message,*] correctly sign message M when checked against the y[i,message,*]. (box 42)

4. A sends F(y[i,left,*]), F(y[i,right,*]) and F(y[i,message,*]) to B. (box 44)

5. B computes HASH(i). (box 46) By definition, this is: F(F(y[i,left,*]), F(y[i,right,*]), F(y[i,message,*]).

6. If the value of i is 1 (box 48), then B checks that the value of HASH(l) computed from the values A transmitted matches the entry HASH(l) in the public file (box 50), and the algorithm terminates.

7. If i is not equal to one (boxes 48 and 52), A computes HASH(i) and signs HASH(i) with the appropriate subnode signature from node i/2, and sends this signature to B (boxes 54 and 56).

Thus:

If i is even, A sends y[i/2,left,*] to B and signs HASH(i) with the correct subset of x[i/2,left,*].

If i is odd, A sends y[i/2,right,*]] to B and signs HASH(i) with the correct subset of x[i/2,right,*].

8. B computes HASH(i) and verifies that it was properly signed by checking the x's against the y values sent by A. (box 58)

9. Both A and B replace i by i/2 and proceed to step 4 (boxes 60 and 62).

When the algorithm terminates, B has $1 + \log_2 i$ signatures, where $\log_2 i$ is rounded down to the closest integer.

One of these signatures is the signature for message M that B actually wanted, while each of the others verifies the correctness and validity of the next signature — and the validity of the "root" signature is attested to by the entry in the public file. Thus, this "audit trail" of one time signatures starts with HASH(l), proceeds to HASH(i), and finally terminates with the one time signature for message M.

Some other things to note are that each node in the tree will normally be used only once to sign a message, and that the nodes will normally be used in numeric order. Actually, each node could be used more than once, but this not an advisable practice because it reduces security Another thing to note is that the nodes need not be used in exact numeric order (e.g., the nodes could be selected randomly from a large set of nodes, relying on chance to avoid use of the same node twice) — but that the nodes will normally be used in this order to minimize the length of each signature.

Figure 5:
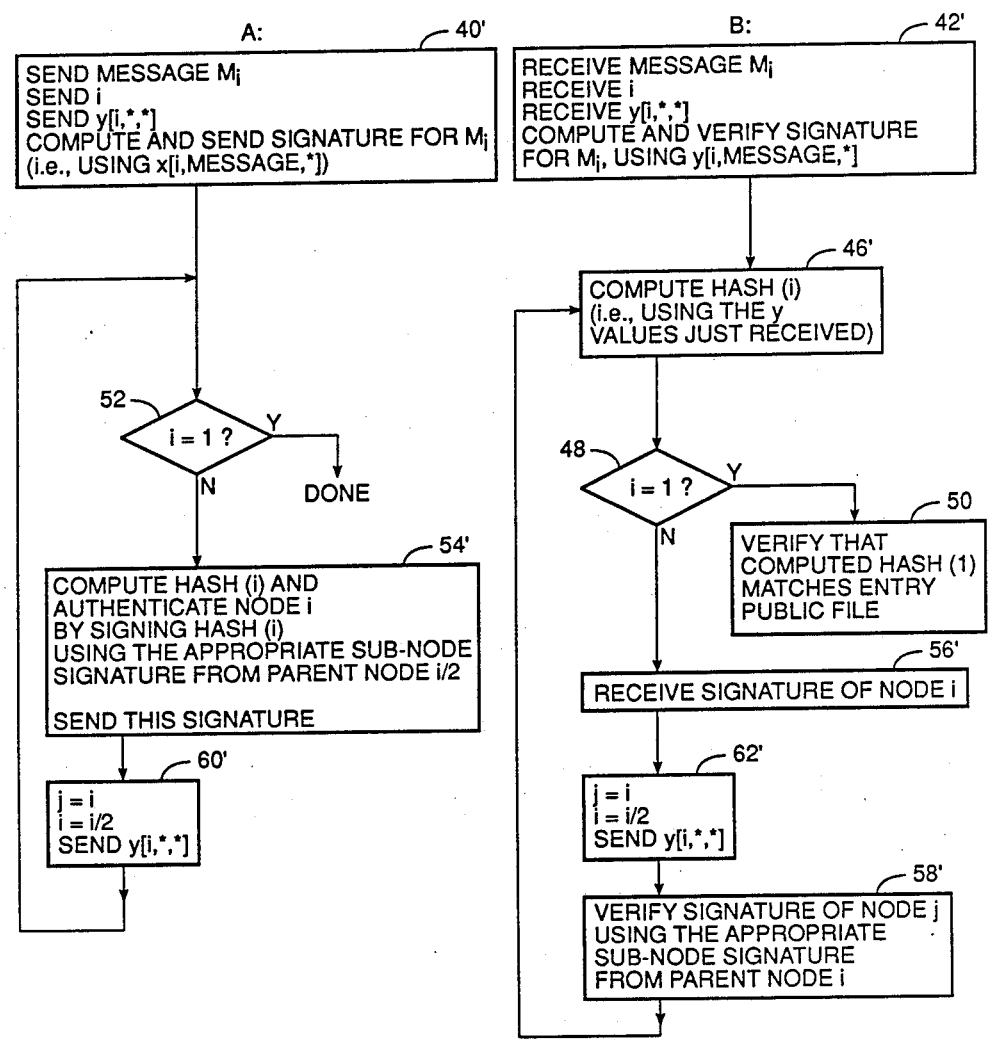

Referring to FIG. 5, in an alternate preferred embodiment, certain details of the method are modified. Thus, A sends y[i,*,*] values (boxes 40' and 42') instead of sending y[i,message,*] and then sending the F(y[]) values. B computes the F(y[]) values from the y[i,*,*] values when computing HASH(i) (box 46'). At the end of the loop (boxes 54' 62'), A simply sends all of the y[i,*,*] values for the parent node instead of just sending the y values needed to sign the current node. By consistently sending B all of the y[i,*,*] values for all of the nodes used, the method is simplified.

It should be clear that this system can utilize any one time signature system and any one way function, and that improvements in the one time signature system will produce corresponding improvements in the overall system's performance. There is no particular reason to believe that current one time signature systems have reached a plateau of perfection, and so further research into one time signature systems might well produce worthwhile performance improvements.

Figure 6:
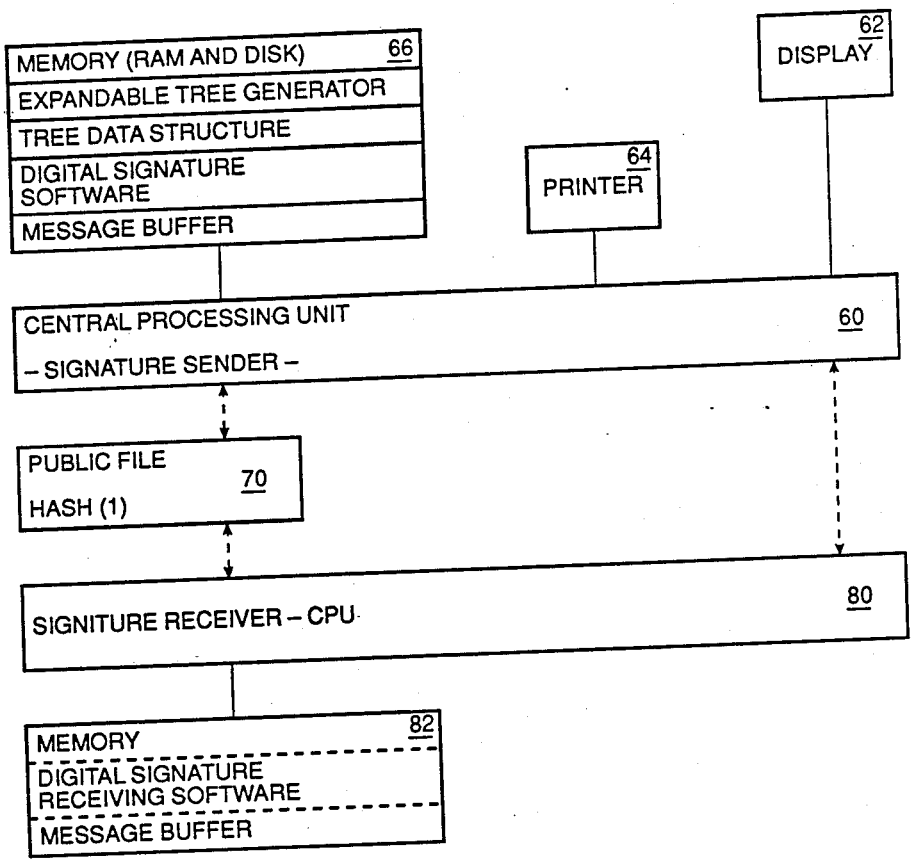
FIG. 6 is a block diagram of a system incorporating the present invention.

Referring to FIG. 6, there is shown a block diagram of a system incorporating the present invention. The signature sender will typically have a computer with a central processing unit 60, display 62, printer 64 and memory 66 for storing, among other things, the digital signature software, a signature tree data structure (or a portion of the tree data structure), tree node generating software for exanding the tree data structure as more messages are sent, and a message buffer. The HASH(l) value for validating signatures is stored in a public file 70, which may be a publicly available network or data base.

The signature receiver will also have a computer with a central processing unit 80. While the signature receiver may also be able to sign messages, to receive messages the receiver needs only memory 82 for storing messages and software for receiving and verifying signatures.

Alternate Embodiment Using K-ary Tree

It should also be clear that the use of a binary tree is arbitrary — it could just as easily be a K-ary tree, and probably will be in practice. A binary tree requires $\log_2 i$ one time signatures, while a K-ary tree requires only $\log_K i$ one time signatures — which generally results in a smaller overall signature size for larger values of K. However, in a K-ary tree the computation of HASH(i) becomes:

```
F(
  F(y[i, first-sub-node,*]),
  F(y[i,second-sub-node,*]),
  F(y[i, third-sub-node,*]),
  .
  .
  F(y[i, Kth-sub-node,*])
  F(y[i,message,*])
)
```

This computation is slower (because all the y's for all the K sub-nodes must be recomputed) and larger (each sub-node introduces an additional value F(y[i,some-sub-node,*]) which becomes part of the signature). Thus, the optimal value of K can't be too large — or it will run afoul of these limitations.

It should be noted that the number of subnodes for each node can be different for different nodes — and that tree structures with varying numbers of subnodes are used in other areas of computer science.

The problem of minimizing the additional authentication information required within each node as the value of K increases is actually interesting in its own right. As described above, the information required as part of the signature at each node will increase linearly with K. This has been reduced to $\log_2 K$ in the author's "tree signature" method (which is very different in concept and implementation from the current method). See chapter 5 of Secrecy, Authentication and Public Key Systems, by Dr. Ralph Merkle, UMI Research Press (1982). Combining the two systems into a single hybrid seems quite appropriate and would allow rather large values of K to be used efficiently.

Finally, some readers might object that the infinite three dimensional arrays x and y might be awkward for user A to store — and so a compaction scheme seems appropriate. The array of y's is computed from the array of x's, and so the y's need not actually be stored. The array of x's is randomly chosen by A in any fashion that A desires. A might just as well generate the x's in a secure pseudo-random fashion. In particular, A can compute x[i,j,k] by concatenating i, j, and k and then encrypting this bit pattern with a conventional encryption function using a secret key:

$$x[i,j,k] = S_{A's\ secret\ key}(<i,j,k>).$$

If we were to use DES, A's secret key need only be 56 bits. Even after many of the x's had been made public (in the course of signing various messages) it would be impossible to determine A's secret key. The pairs ($<i,j,k>$, x[i,j,k]) are plaintext-ciphertext pairs and by definition the key of a conventional encryption function cannot be determined even if many such pairs are known. In this case, the secret key used above would be the secret signing key known only to A: $SIGN_A$.

Conclusion

A digital signature system has been presented which is based solely on a conventional encryption function. The algorithms to sign and check signatures are rapid and require only a very small amount of memory. The size of the signatures grows as the logarithm of the number of messages signed. Signature size and memory requirements can be traded off against computational requirements.

A significant advantage of the present invention is that its security is based only on one way functions and the existence of such functions seems assured. This is not an issue of purely academic interest, especially in light of the large number of "unbreakable" cryptographic systems that were subsequently broken.

Another advantage of the present invention is its reduced computational cost as compared with systems that require modular arithmetic: a software implementation of DES (the Data Encryption Standard) runs much faster than exponentiation modulo N, so a digital signature system based on use of DES would likewise benefit. This savings becomes more significant in a hardware implementation because DES chips are already available at low cost from many manufacturers, and are already present in many existing systems.

The new digital signature system described herein is very fast indeed when retro-fitted to a system that already has a DES chip (or a hardware implementation of any conventional encryption function). While the present invention has been described with reference to a few specific embodiments, the description is illustrative of the invention and is not to be construed as limiting the invention. Various modifications may occur to those skilled in the art without departing from the true spirit and scope of the invention a defined by the appended claims.

What is claimed is:

1. A method of generating digital signatures for signing a series of messages $M_i$, the steps of the method comprising:

defining a tree of signature nodes having a root node and a multiplicity of additional nodes {node$_i$}, wherein at least a multiplicity of said nodes include message signing means for signing a message using a predefined one time signature, and subnode signing means for signing a plurality of subnodes using a predefined one time signature, wherein said subnodes are nodes on said tree which branch from said node;

storing a root node authentication value for authenticating said root node in a nonsecret location;

signing a message $M_i$ by (a) generating a message signature for message $M_i$ using said message signing means of node i;

(b) relating said message signature to said root node authentication value by using said subnode signing means for signing each node in said tree which forms a chain of subnodes between said root node and node i;

whereby the receiver of message $M_i$ can authenticate message $M_i$ by using said predefined one time signatures to relate said message signature to said root node authentication value.

2. The method of claim 1, wherein said root node authentication value is generated by applying a predefined one time signature to said root node.

3. The method of claim 1, wherein said tree is infinitely expandable.

4. The method of claim 3, further including the step of defining a new node i on said tree, using a randomly selected number to generate a set of one time signatures for said new node.

5. The method of claim 4, wherein said new node defining step includes the steps of defining a set of pseudorandom numbers derived from said randomly selected number, and using said pseudorandom numbers to generate corresponding one time signatures.

6. The method of claim 4, wherein said pseudorandom numbers are generated by encryping a predefined set of values using a predefined cryptographic function S with said randomly selected number as the key for said predefined cryptographic function S.

7. The method of claim 1, wherein said tree is infinitely expandable so that each node can be the parent node for a plurality of subnodes, and each subnode has one parent node; and said step of signing each node in said chain is performed by denoting as the current node the node used to sign said message $M_i$, and then repeatedly performing the steps of:

signing the current node with said subnode signing means of the parent node of said current node; and denoting said parent node as the current node; and stopping the performance of said repeated steps when the current node is said root node.

8. A method of generating digital signatures for signing a series of messages $M_i$, the steps of the method comprising:

defining a one way hash function F;

defining a tree of signature nodes having a root node and a multiplicity of additional nodes {node$_i$}, wherein said tree is infinitely expandable so that each node can be the parent node for a plurality of subnodes, and each subnode has one parent node;

wherein said root node and at least a multiplicity of said additional nodes include:

message signing means for signing a message using a predefined one time signature, and subnode signing means for signing a plurality of subnodes using a predefined one time signature;

generating a root node authentication value for authenticating said root node by applying said function F to said message signing means and said subnode signing means for said root node, and storing said root node authentication value in a nonsecret location;

generating a signature for message $M_i$ by (a) generating a message signature for message $M_i$ using said message signing means of node i;

(b) relating said message signature to said root node authentication value by using said subnode signing means for signing each node in said tree which forms a chain of subnodes between said root node and node i; wherein said step of signing each node in said chain is performed by the steps of:

generating a HASH value for said node by applying said function F to said message signing means and said subnode signing means for said node; and using said subnode signing means of the parent node of said node to generate a signature for said HASH value;

whereby the receiver of message $M_i$ can authenticate message $M_i$ by using said predefined one time signatures to relate said message signature to said root node authentication value.

9. The method of claim 8, wherein said message signing means for each said multiplicity of nodes includes message signature authentication means for verifying the signature of a message;

said subnode signing means for each said multiplicity of nodes includes subnode signature authentication means for verifying the signature of a node;

said method further including the step authenticating said signature for message $M_i$ by the steps of:

(a) applying said message signature authentication means for node i to said message signature for message $M_i$;

(b) relating said message signature to said root node authentication value by using said subnode signature authentication means for authenticating each node in said tree which forms a chain of subnodes between said root node and node i.

* * * * *